Feb. 22, 1966  R. A. PARKER  3,236,415
MONITORING SYSTEM FOR FUEL DISPENSING APPARATUS
Filed June 16, 1964  2 Sheets-Sheet 1
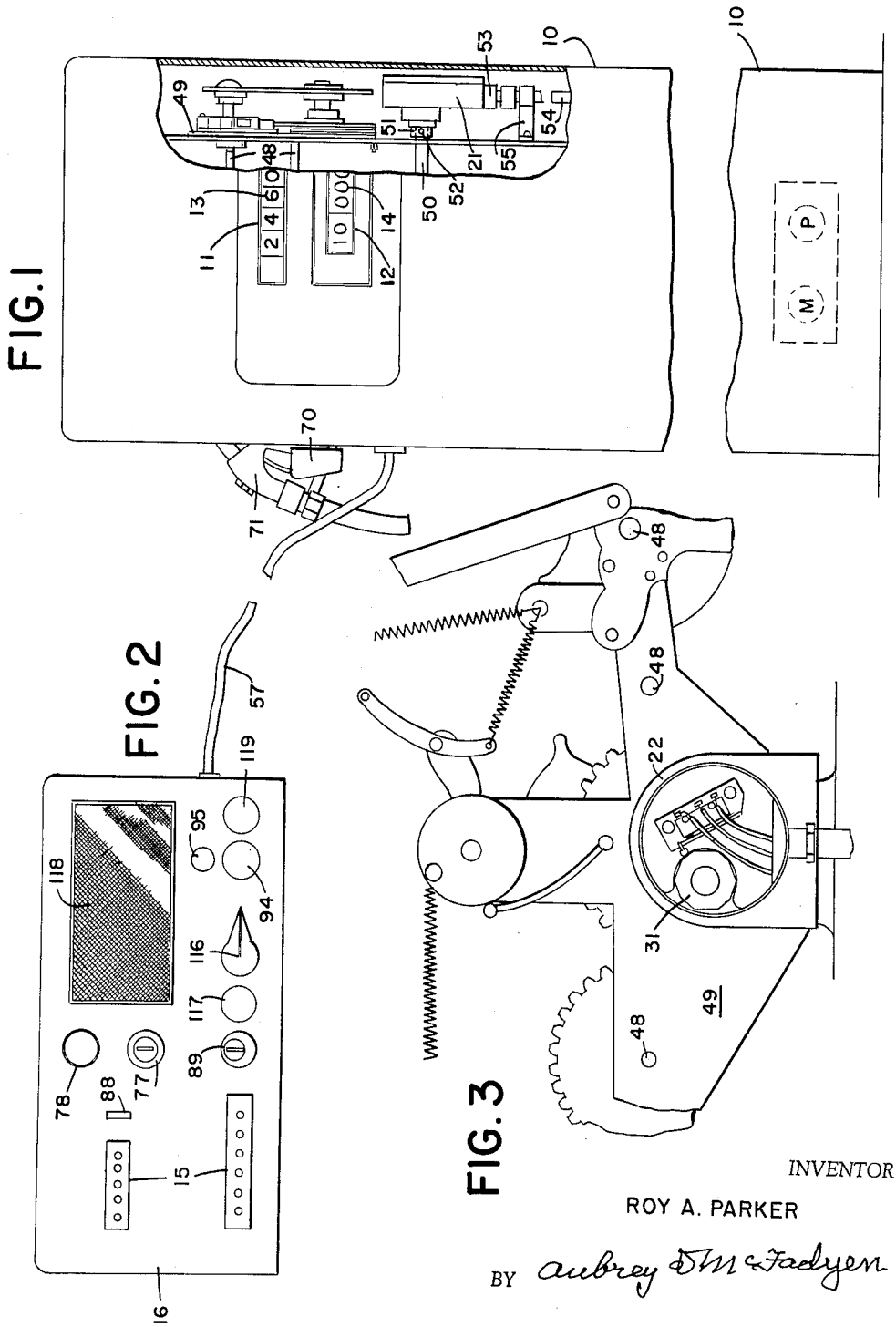
INVENTOR
ROY A. PARKER
BY Aubrey DM McFadyen
ATTORNEY Feb. 22, 1966   R. A. PARKER   3,236,415
MONITORING SYSTEM FOR FUEL DISPENSING APPARATUS
Filed June 16, 1964   2 Sheets-Sheet 2
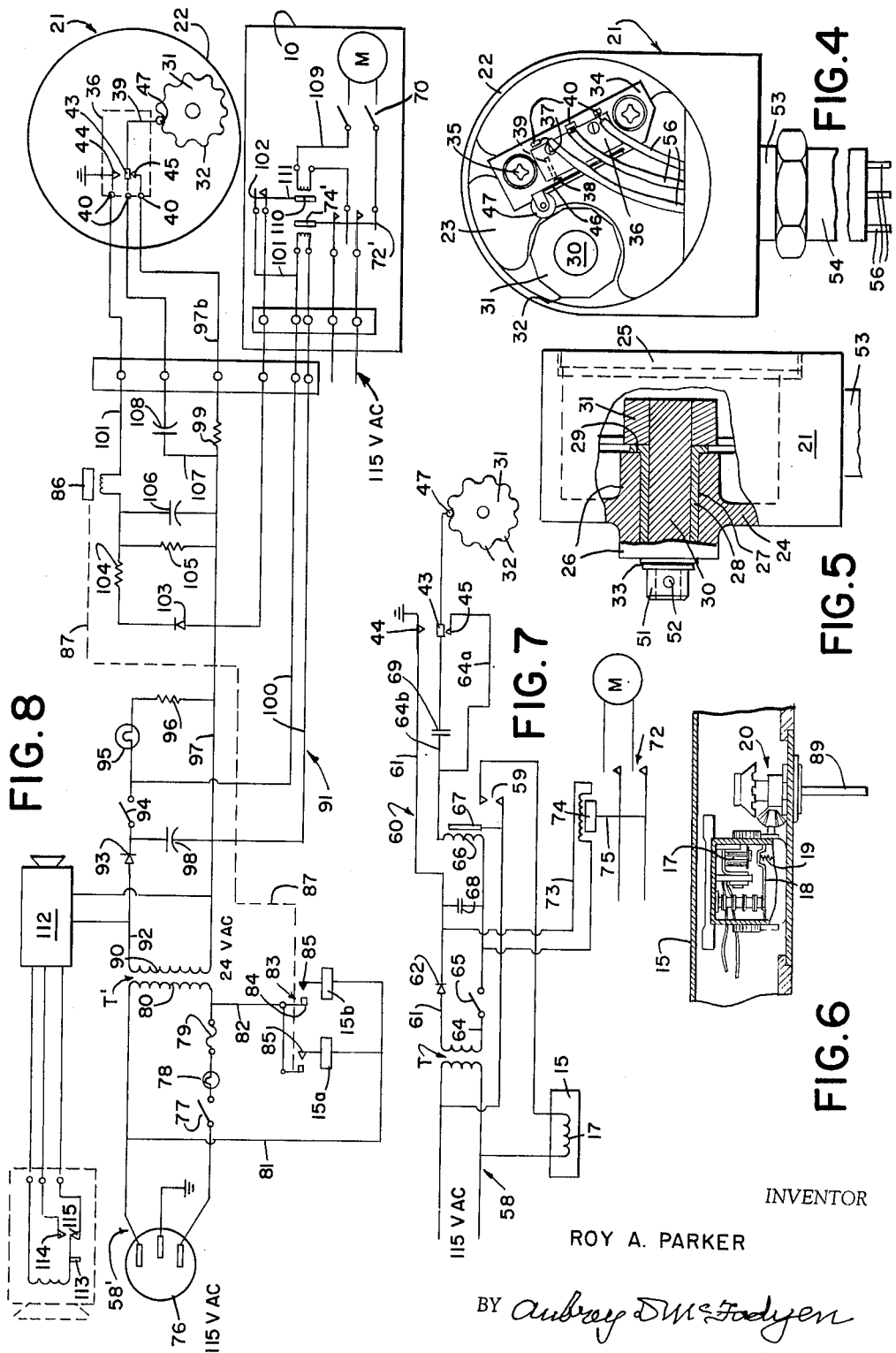
INVENTOR
ROY A. PARKER
BY Aubrey D. McFadyen
ATTORNEY

United States Patent Office 3,236,415
Patented Feb. 22, 1966

3,236,415
MONITORING SYSTEM FOR FUEL
DISPENSING APPARATUS
Roy Anderson Parker, P.O. Box 1249, 2606 Raeford
Road, Fayetteville, N.C.
Filed June 16, 1964, Ser. No. 375,518
11 Claims. (Cl. 222—25)

This application is a continuation-in-part of my application Serial No. 197,491 for "Monitoring System for Fuel Dispensing Apparatus," filed May 24, 1962, now abandoned.

This invention relates to dispensing apparatus, and more particularly to a monitoring system for liquid fuel dispensing apparatus of the type commonly employed at motor vehicle service stations.

In certain businesses where a fleet of motor vehicles are operated, such as in the distribution organizations of a dairy, bakery, newspaper, and the like, it is common practice to supply the fleet with fuel from the conventional service station type pump located in the company yard. For economy, it is desirable that each of the drivers of the several motor vehicles operate the dispenser apparatus in servicing the vehicle assigned to him. Such dispensing apparatus is commonly located within easy view of the office, or else an "intercom" system is provided, and by remote control from the office power may be supplied to the pump for a dispensing operation, and likewise the power is cut off upon its completion. In the prior arrangement just mentioned, each driver reports to the office over the intercom system the amount of fuel withdrawn. In an attempt to prevent misappropriation in the circumstance aforementioned, daily records are kept of the fuel reportedly supplied to each vehicle, as well as the mileage reading thereof. In regard to general service stations, as is well known, after serving a customer the attendant commonly simply reports orally to the owner or operator the amount or price of the fuel dispensed. Both of the arrangements just discussed present openings for, and in fact invite misappropriation. Therefore the value of a practical, relatively inexpensive monitoring system in the field of liquid fuel dispensing is deemed manifest.

With the foregoing in mind, it is the primary object of the present invention to provide a monitoring apparatus or system for use with conventional liquid dispensing apparatus or pumps, whereby the exact reading of the fuel dispensed will currently appear on a remote register or counter convenient to the owner or operator.

A further object of the present invention is to provide apparatus of the kind aforementioned which may be readily coordinated to conventional type dispenser apparatus without necessitating modification of the latter.

A further object of the present invention is to provide apparatus of the kind aforementioned wherein the control or transmitter unit of the monitoring system is designed to be mounted within the cabinet or housing of a conventional dispenser apparatus.

Still another object of the present invention is to provide a monitoring system of the kind aforementioned wherein the response of the supervisory register is instantaneous for each unit dispensed and progresses only in preselected unit increments.

Another important object of the present invention is to provide a remote monitoring apparatus or system for conventional fuel dispensing apparatus or pumps, wherein a controller for transmission of an impulse to a remote register is directly connected with a unit shaft of the dispensing apparatus or pump mechanism and is electrically coordinated with a remote register controlled by impulses from the transmitter.

A further object of the present invention is to provide apparatus of the kind aforementioned wherein power to the dispensing apparatus is primarily under control of a relay switch, the energization or deenergization of the remote monitor unit by its supervisor automatically operating said switch.

Still another object of the present invention is to provide apparatus of the kind mentioned in the preceding paragraph wherein should the momentum of the dispensing apparatus continue appreciably after deenergization thereof by said relay switch, the excess dispensed will continue to be reflected on said monitor unit.

Another object of this invention is to provide a monitoring system of the kind aforementioned wherein shutting off the pump of the dispenser apparatus will automatically cause the remote supervisory register to stop on an exact decimal reading, whereupon the supervisory register is unaffected by zeroizing of the dispensing apparatus.

Still another important object of the present invention is to provide in a monitoring system of the kind aforementioned an extremely compact and simple pulse control unit.

Another object of the present invention is to provide a monitoring system of the kind aforementioned that is relatively inexpensive to manufacture, efficient in operation, easily maintained, and has a long operational life.

Other objects and advantages of the present invention will become apparent from the detailed description of the invention to follow.

With the foregoing objects in view, the invention consists in the combination and arrangement of parts as will be described more fully hereinafter and pointed out in the claims, it being understood that changes in the specific structure shown and described may be made within the scope of the appended claims without departing from the spirit of the invention.

In the accompanying drawings forming a part of this specification, and in which like numerals of reference indicate similar parts in the several views:

FIGURE 1 is a front elevation of a conventional fuel dispensing apparatus, a portion of the front wall thereof being broken away to reveal schematically a transmitter or pulsing control unit associated with the one-gallon shaft of the register mechanism thereof;

FIGURE 2 is a front elevation of the monitoring unit or console for registering at a remote position of the supervisor the amount of fuel dispensed by the apparatus of FIGURE 1;

FIGURE 3 is an elevational end detail of a portion of the register means of the conventional fuel dispenser apparatus of FIGURE 1, showing the relation of the transmitter or pulse control unit to the one-gallon shaft of said register means;

FIGURE 4 is a face view of the transmitter or pulse control unit in full scale, the cover thereon being removed;

FIGURE 5 is a side view of the unit of FIGURE 4, a portion of the casing being broken away;

FIGURE 6 is a detail of a portion of one of the conventional counters or registers employed in the console of FIGURE 2;

FIGURE 7 is a diagram of a simplified circuit employed with the console and dispenser apparatus of FIGURES 1 and 2; and FIGURE 8 depicts the present commercial embodiment of the circuit employed in the organization of FIGURES 1 and 2.

In general, the present invention is comprised of 1 a pulse controlling unit or transmitter connected to and operable by a unit shaft of a conventional liquid dispensing apparatus, such as is used in motor vehicle service stations, the transmitter unit effecting decimal electrical or electromagnetic impulses for each predetermined decimal unit movement of said shaft; 2 a remote two-step electromagnetically operated monitoring register or counter convenient to a supervisory person; and 3 circuitry or space communication means interrelating said transmitter and remote register for currently registering on the latter the volume, both instant and accumulative, of fuel dispensed, as well as the price thereof.

In presently available electromagnetically operated registers or counters the energization of a coil thereof commonly actuates the counter but a half step, and upon deenergization thereof a spring return advances the counter the remaining half step. Therefore, should the transmitter stall or stop in register energizing position, the register will be stopped in an unsatisfactory half-step position which is difficult to read. In the arrangement of the present invention the energization of the counter is always caused by an instantaneous, discrete impulse which permits the spring immediately thereafter to advance the counter through the second phase of its cycle, whereby readings on the counter will always be in full increments of liquid volume and/or price.

Referring now to the drawings and for the moment to FIGURES 1-3, reference numeral 10 designates the cabinet of a conventional service station fuel dispensing apparatus. Such dispensing apparatus include a pump P and a motor M for driving the pump, shown schematically as in the lower portion of the cabinet. In the upper portion of the cabinet are duplicate sets of registers 11, 12 viewable from both the front and rear of the cabinet. Upper register 11 includes a set of drums 13 for indicating the price of the fuel dispensed and lower register 12 includes a like set of drums for indicating the volume of fuel dispensed. The right hand drum 14 of the volume register is calibrated in units of $\frac{1}{10}$ gallon, the next drum to the left in gallons, and the third to the left in tens of gallons, and so on.

As alluded to above, with the present invention currently produced readings of either or both of the aforementioned items; that is, price and/or volume, or the volume being dispensed at the moment, as well as the accumulated volume, are reproduced by an electromagnetically operated register or counter means at a remote point convenient to a supervisory person to facilitate his or her maintaining surveillance of the operation. Numeral 15 designates such registers or counters, which normally form part of a console 16 positioned within the office or other location convenient to a supervisor. Each counter includes a coil 17 and an armature 18 adapted to be drawn toward the coil upon energization of the latter by an electrical impulse. Upon deenergization of the coil a spring 19 restores the armature to its original, normal, position. In being drawn toward the coil, ratchet means (not shown) associated with the armature advances the first drum at the right one half-step; and in being restored to the normal position by spring 19, further ratchet means advances said drum another half-step, as is well known and conventional. Each counter may be provided with reset means 20 operable by a key or punch button, as desired. It is contemplated that the upper counter will be zeroized by the supervisor at the start of each dispensing operation, and the lower counter will function as a daily or inventory totalizer.

For controlling electric impulses to the monitoring counters 15 in relation to the fuel dispensed, the triggering device 21 of FIGURES 4 and 5 is provided. This device includes a cupped casing 22 defining a generally circular compartment 23. As viewed in FIGURE 5, the left hand end of the compartment is closed by a wall 24, while the open end of the casing is normally closed by removable cap 25. Wall 24 is formed with aligned bosses 26 on opposite sides thereof, the bosses being disposed eccentrically to the center axis of compartment 23, and there is a cylindrical opening 27 formed through the bosses and wall. Within opening 27 is provided a bushing 28 having an inner flange 29, and a cam shaft 30 is journalled in said bushing. To the inner end of shaft 30 is fixed a cam 31 similar in appearance to the distributor cam of automobile engines, except that the present cam is formed with ten peaks or lobes 32. Cam 31 abuts the flanged end of bushing 28, and a retaining ring 33 is fixed adjacent the outer end of shaft 30 to prevent axial movement of the latter.

Within compartment 23 is an insulated support 34 held in place by a pair of screws 35. A flat push-bottom type single pole, double throw, snap-acting microswitch 36 of well known design is mounted on support 34 by a pair of screws 37. The plastic housing of microswitch 36 is on the order of ¾ inch in length, about $\frac{5}{16}$ inch wide, and $\frac{3}{16}$ inch thick. 38 designates the button of the switch, which has a stem or pin 39 slidable in the edge wall of said housing. Button 38 is biased outwardly. Three like electrodes 40 lead through the housing of the switch to a corresponding number of contacts within the housing. The center electrode connects with a movable contact 43 associated with the inner end of the pin 39, and the other two electrodes run respectively to fixed contacts 44 and 45, the arrangement being schematically shown in FIGURE 8. A light rocker finger 46 is pivoted at or adjacent one end thereof to either said insulated support 34 or to the housing of switch 36, as may be desired. Finger 46 extends substantially parallel with the narrow edge of said housing and at an intermediate point thereof presses on button 38. At its outer end the finger is provided with a rider, shown as a roller 47, which contacts and rides upon the surface of cam 31. When the roller approaches a peak of the cam the movable contact 43 of the switch will engage fixed contact 44. When the roller recedes from said peak, the movable contact will suddenly snap to engage with fixed contact 45, as schematically shown in FIGURES 7 and 8.

The register mechanism of each dispensing pump includes a series of interrelated shafts 48 (FIGURES 1 and 3) running parallel with the front and rear walls of the cabinet 10. These shafts are rotatably mounted at each end in end plates 49, which are similar to the mounting plates for the several shafts of clocks. Said shafts include a "one-gallon shaft," as it is called; that is to say, a shaft which makes precisely one complete rotation for each gallon or other basic volumetric unit dispensed. The one-gallon shaft 50 projects through end plates 49 for a matter of about half an inch. Cam shaft 30 is provided with means for coupling same to the projecting end of the one-gallon shaft. This means is illustrated as in the form of a socket 51 on the exposed end of the cam shaft for receiving the end of the one-gallon shaft therein. A set screw 52 passes through the wall of said socket for fixing the two parts together.

Casing 22 is designedly thin enough to be interposed between the ends of the register mechanism of the dispenser apparatus and the end wall of cabinet 10, and for the cam shaft 30 to be connected to said one-gallon shaft. A tubular nipple 53 projects downwardly from the under portion of casing 22 and a section of cable or conduit 54 extends from said nipple to the exterior of the cabinet. An U-shaped strap 55 fits around the upper portion of cable 54, and the end portions of its legs are fixed to end plate 49 for stabilizing the casing 22. The cable or conduit 54 includes three wires 56 which are connected respectively to electrodes 40. Exteriorly of cabinet 10, the three wires 56 extend to the console in any approved form of conductor 57.

By employing a single pole, double throw switch in the device as illustrated in FIGURES 4 and 5 in conjunction with certain circuitry presently to be described, the drawback of the pulse triggering unit's stopping with the monitor counter energized and thus retained in half-step position, is eliminated. The basic circuit and principle underlying the present concept will be clear from FIGURE 7. Here numeral 58 designates a 115 v. A.C. power input, and one or more counters 15 are located convenient to the supervisor and connected across the power input line to be advanced a half-step upon each closing of switch 59 and resulting energization of the coil 17 of the monitor counter, as previously explained. For economy of wiring and greater safety by avoidance of sparking, etc., a transformer T reduces the input voltage to on the order of 24 v. A.C. in a subsidiary circuit 60.

The upper line 61 of the subsidiary circuit is shown as containing a half wave rectifier in the form of a diode 62, and this line then extends to fixed contact 44. The lower line 64 includes a switch 65 and the coil 66 of a relay 67, which latter upon being energized acts on its armature to close switch 59 and thus energize the monitor counter. Beyond relay 67 lower line 64 divides, one branch 64a extending to the fixed contact 45 of the microswitch 36 and the other branch 64b thereof contains a secondary capacitor 69 and leads to the movable contact 43 of the microswitch pin. Interposed between the upper and lower lines 61 and 64 in advance of coil 66 is a primary reservoir capacitor 68 designed to supply the current impulse to be sent through the coil of relay 67. The third contact 44 of the microswitch optionally may be a permanent ground for line 61. Lines 61, 64a and 64b will now be recognized as the three wires 56 heretofore described as comprising cable 57 running between the console and dispensing apparatus.

When the roller 47 of microswitch 36 is in the midway zone between the lobes of cam 31, the movable contact 43 engages fixed contact 45 of the lower branch line 64a, whereupon the voltage impressed upon the plates of condenser 69 is equal, there is no flow of current through relay 67, and switch 59 therefore remains open. When rotation of cam 31 raises contact 43 into engagement with grounded contact 44, it triggers the cycle of recharging capacitor 69, and there is an instant, discrete surge of current from capacitor 68 and through relay 67 bent upon recharging capacitor 69, which thus instantaneously closes switch 59 which once the discrete surge of current is over, immediately reopens with resultant energization and deenergization of the monitor counter. Even though cam 31 stop with the contacts 43 and 44 in engagement, since the monitor counter has just been advanced a full decimal step in the recharging of capacitor 69, it will not be actuated again unless and until the cam rotate sufficiently to go through the cycle of discharging capacitor 69; that is, the cycle of reengagement of the movable contact 43 alternately with each of the fixed contacts.

In service station type dispensing apparatus, current to the motor that drives the pump is conventionally under control of a manipulable lever 70 disposed near the support for the dispenser nozzle 71 when the latter is not in use. In the present invention, a further switch 72 is interposed in the power line running to pump motor M. Switch 72 is biased to a normally open position, and means is provided whereby switch 72 may not be closed and the pump energized unless and until authorized at the console. This means is comprised of a line 73 leading from line 61 through a relay 74 and thence to juncture with line 64. An element 75 interconnects the armature of the relay and switch 72 in the power line, whereby the latter may be closed and so retained only upon corresponding actuation of switch 65 by the supervisor. Thus the dispenser apparatus can not be started simply by the attendant's throwing the conventional lever 70 of the pump to the "on" position.

In the wiring diagram of the present commercial embodiment of my invention as shown in FIGURE 8, 58' designates the 115 v. A.C. power input to the console. This input includes a three-pronged plug 76, the center prong serving as a ground. The input circuit includes a key-operated switch 77 in the console, with an "On-Off" indicator 78 therefor, and a fuse 79. The input further includes the primary coil 80 of a step-down transformer T'. A pair of counters 15a and 15b, located on the console, are connected in parallel into the input circuit by lines 81 and 82, said connection including duplicate switch devices 83 each having a shiftable contact 84 operable in unison to establish connection between line 82 and the input electrodes 85 of the counters. Switch devices 83 are biased toward a normally open position and are shiftable to closed position by a relay 86, the armature of which is mechanically connected to shift the movable contacts 84 of the switch devices by means of a pull element 87, as shown in dotted lines. Counter 15a is for registering the instant dispensing operation and may be conveniently reset by a push-in element 88; while counter 15b is for registering the accumulated operation of the dispenser apparatus and can be zeroized, as for making an inventory check, by key 89, through the conventional gear mechanism 20 shown in FIGURE 6.

Secondary coil 90 of the transformer is designed to supply on the order of 24 volts to a subsidiary circuit designated generally at 91. Starting from said secondary coil, the upper line 92 of the subsidiary circuit includes, in sequence, a diode type half-wave rectifier 93, a key-operated switch 94, a pilot lamp 95, and a resistor 96, which latter is connected to the return line 97 to complete the circuit. Resistor 96 serves to cut down the flow of current through lamp 95 and prevent overheating of the filament thereof. A capacitor 98 is interposed between the upper and lower lines 92 and 97 of the subsidiary circuit to dampen or filter any pulsations or ripples effect passing diode 93.

In the embodiment of my invention shown in FIGURE 8 is included substantially the same system as shown in FIGURE 7 for controlling from the console energization of the dispenser motor. To this end I employ a switch 72' in the power line to the pump motor. This switch is actuated by a relay 74' which is interposed in line 100, which latter line runs across the subsidiary circuit, whereby switch 72' controlling the pump motor is "on" or "off" in accordance with the opening and closing of switch 94, the status of the pump motor being indicated at the console by pilot lamp 95.

Counters 15a and 15b are advanced in the manner heretofore recited upon the actuation of the armature of relay device 86, with resultant closing of switches 83. Relay 86 is energized ten times during the dispensing of each gallon of fuel, under control of cam 31 of the triggering device 21. It will be observed in FIGURE 8 that the lower return or ground line 97 of the subsidiary circuit 91 extends beyond its juncture with resistor 96, this extension being designated 97b. It includes a resistor 99, and therebeyond connects with the lower fixed contact 45 of the microswitch unit. From the upper line 92 of the subsidiary circuit line 100 runs through relay 74' and on to line 97 in the manner mentioned above in connection with the operation of switch 72'. Line 100 has a spur 101 which runs through switch 102, and at its end is connected to the fixed contact 44 of triggering device 21. Enroute to contact 44, spur 101 further includes a one-way valve device in the form of a diode type rectifier 103, a resistor 104, and relay 86. It is desirable, though not essential that contact 44 be grounded. Relay 86 is designed so that its armature is actuated upon a surge of current therethrough somewhat greater than is available in the circuit thus far described. Interposed in parallel between lines 101 and 97b, at a point between resistor 104 and relay 86, is a resistor 105 and a primary capacitor 106. Resistor 105 is of rather high ohmage for allowing a slow leak from the capacitor 106 to line 97b. Resistors 104 and 105 and capacitor 106 as a group serve as a filter system; but capacitor 106 serves in addition as a substantial electrical reservoir for supplying surges through relay 86, as will hereinafter appear. It will be observed that a branch line 107 leads off from line 97b in advance of resistor 99, and is connected to movable contact 43 of the triggering device. Branch line 107 includes a secondary capacitor 108. The purpose of resistor 99 is to slow down the rate of discharge of secondary capacitor 108 while in the discharge position of FIGURE 8, thus avoiding sparking and reducing pitting of contacts 43 and 45.

In the position of the movable contact 43 shown in FIGURE 8, secondary capacitor 108 is in a discharged state, since both sides thereof are in direct connection with the common return or ground line 97b, in which state there is no flow of current through relay 86. Also, line 101 is open, due to the movable contact being disengaged from upper contact 44. As cam 31 of the triggering device rotates and roller 47 reaches approximately the peak of a lobe 32, the movable contact engages fixed upper contact 44, whereupon a surge of current, boosted by the primary capacitor 106 and bent upon recharging secondary capacitor 108, passes through relay 86, thus closing switches 83 and causing the counters to advance a half-step, as heretofore described.

When the movable contact 43 is in engagement with fixed contact 45, the triggering device may be regarded as readying or reloading primary capacitor 106 for the firing of an electric slug or impulse through relay 86 to recharge the secondary capacitor upon being triggered by movable contact 43 engaging fixed contact 44.

The momentum of pump motor M, plus that of the fuel in transit, may carry cam 31 an additional step or two after either switch 72′ or the switch 70, the latter controlled by the attendant at the pump, is opened. It is important that this coasting operation of the pump be reflected on the counters. To this end, primary capacitor 106 is of such character as to store a charge capable of recharging secondary capacitor 108 three or more times within the coasting period; that is, after the motor M has been deenergized and the current to capacitor 106 cut off. The arrangement is such that the charge on the primary capacitor will endure for only a maximum of, say ten or fifteen seconds, so that thereafter the zeroizing of the pump register, with incidental rotation of cam 31, will have no effect upon the counters. The foregoing follows first from the fact that upon cutting off current to the pump, current is likewise cut off to capacitor 106 by means of switch 102. Second, one-way valve device 103 prevents discharge of capacitor 106 through lamp 95 when switch 94 is open. Only one increment of the charge on capacitor 106 can be lost to the secondary capacitor each time contacts 43 and 44 close. Finally, escape of the charge through resistor 105 is a timed leakage within the period of seconds aforementioned, after which the entire counter control system is "dead" until both switches 70 and 94 are again closed.

During zeorizing of the dispenser apparatus by a driver or attendant preliminary to operation the system is normally "dead" and capacitor 106 has been discharged through resistor 105, as described in the preceding paragraph. Cam 31 necessarily will be rotated during the zeroizing operation, and were this rotation of the cam transmitted by the circuitry described above, the reading of the counters would be erroneous. To remove all possibility of the error just noted, my invention includes circuitry for discommoding the counters upon stopping of the pump motor, even though the pump motor be released to the driver by closing of switch 94. To this end I first provide in the counter control circuit the switch 102 mentioned above, which is normally biased to the open position shown in FIGURE 8; and in the hot line 109 of the 115 v. A.C. wires leading to the pump motor M, at a point between said motor and switch 72′, I provide a relay 110, the armature of which is connected by an element 111 to close auxiliary switch 102. Thus, only so long as the pump motor is drawing current relay 110 will maintain switch 102 closed and the system in condition to charge capacitor 106 for operating the counters. This condition is maintained until the circuit to the pump motor is broken by the opening of either switches 72′ or switch 70.

It is contemplated that the supervisor at the console should be in communication with the person seeking withdrawal of fuel at the pump. Where the pump is obscured from view or beyond easy ear range, a conventional "intercom" system is provided. Such systems are available for connection to either the 115 volt input line or to the 24 volt subsidiary circuit. Normally the transmitter 112 at the pump will remain "on," and the supervisor wil shift the button 113 at the console unit of the intercom system to one or the other of contacts 114, 115, in accordance with whether he is to speak or listen. In FIGURE 2, 116 designates the flip switch corresponding to the button schematically shown in FIGURE 8; while 117 designates a combined switch and volume control for the intercom system. The console speaker-transmitter is located behind porous covering 118. A selector switch 119 is provided whereby any one of several dispensing units may be monitored from a single console.

Having thus described the nature of my invention and certain preferred embodiments thereof, it will be understood that various further modifications may be resorted to within the scope and spirit of my invention as defined in the appended claims.

What is claimed is:

1. A system for monitoring from a distance fuel dispensing apparatus of the type including a pump having volumetric registering mechanism, said pump being driven by an electric motor operating on standard A.C. input including a primary switch under control of the attendant, said system comprising a console for a supervisor, a standard A.C. input circuit to said console, said circuit including a switch and the primary coil of a step-down transformer, a line bridging said circuit and including electromagnetically actuated counter means at said console operable a half-step upon being energized and a half-step upon being deenergized, switch means in said line for controlling energization and deenergization of said counter means, a low voltage relay device including an armature mechanically connected to said switch means for operating the latter, a triggering device at said dispensing apparatus within the cabinet thereof and including a rotary cam formed with a plurality of equally spaced peaks about its periphery, said cam being fixedly mounted upon the end of a shaft of said register mechanism, a switch housing disposed adjacent said cam, said switch housing having therein two fixed contacts and a movable contact therebetween, rider means cooperating with said cam and said movable contact to shift the latter alternately to one then the other of said fixed contacts as said cam rotates, a low voltage subsidiary circuit including a secondary coil of said transformer, a first line including a rectifier and running from one end of said coil to one of said fixed contacts of said triggering device, said first line including said relay device for said counter control switch means, a second line running from the opposite end of said secondary coil to the other of said fixed contacts, a primary storage capacitor interposed between said first and second lines in advance of said relay device, a branch line leading from said second line and connected to said movable contact, said branch line including a secondary capacitor to be charged from the first capacitor by a surge of current passing through said relay device upon said movable contact engaging in sequence both said fixed contacts, thus resulting in the energization and deenergization of said counter means.

2. The system as defined in claim 1 further including an auxiliary relay controlled switch in the power circuit to said motor, a third line running from said first line to said second line and including said last named relay, and a switch in said subsidiary circuit at the console, whereby said motor may be operated only upon closing of said console switch.

3. The system as defined in claim 1 wherein the first line of said subsidiary circuit between the rectifier and relay therein is provided with a switch normally biased to open position, the hot line to said motor includes a relay device having an armature connected to said last mentioned switch, whereby the monitoring system is discommoded for zeroizing of the pump register mechanism upon deenergization of said motor and discharge of said primary capacitor in the manner described.

4. The monitoring system as defined in claim 1 wherein said first line of the subsidiary circuit in sequence and in advance of said relay device includes a switch, a spur line leading off to the second line and including a pilot lamp, a one-way valve device in the form of a diode and a resistor, to thus prevent discharge of said primary capacitor through said lamp upon opening of said switch.

5. The structure as defined in claim 4 wherein said primary capacitor is of a character capable of charging the secondary capacitor on the order of three times without itself being recharged, and a leak resistor of high ohmage is interposed between said first and second lines immediately in advance of said primary capacitor, whereby said counter means will be operated during any coasting period following hard upon deenergization of said motor.

6. A monitoring system for fuel dispensing apparatus including an electric motor driven pump and a power input thereto, comprising a remote electric impulse operated counter in said power line and located convenient to a supervisor, a switch controlling power input to said counter, a relay device operated when energized to close said switch to temporarily energize said counter, means for triggering energization of said relay device including a sealed casing, a rotary 10-lobed cam in said casing and fixed to a unit shaft of the register mechanism of said dispensing apparatus, a single pole, double throw switch device in said casing, said device including two fixed contacts and a third movable contact therebetween and operable by said cam to alternately engage said fixed contacts, a low voltage subsidiary circuit including a first line having said relay device therein and terminating at one of said fixed contacts, and a second line leading to the other of said fixed contacts, a spur line leading from said second line to said movable contact, a primary storage capacitor bridging said first and second lines in advance of said relay device and spur line, said spur line including a secondary capacitor to be charged from said primary capacitor by current passing through said relay device upon said movable contact engaging sequentially the contact of said second and first lines.

7. A monitoring system for fuel dispensers of the type disclosed comprising a remote electrically operated decimal type monitoring counter of the type to be advanced step by step upon each discrete energization thereof, a triggering device consisting of a cylindrical sealed casing, circuitry interconnecting said triggering device and remote counter, a shaft journalled in said casing eccentrically to the axis thereof, one end of said shaft projecting through an end of said casing and being connected to a rotary element of the counter of said dispenser apparatus, a 10-lobed cam on said shaft within said casing, a switch device in said casing and actuated by said lobes seriatim to trigger release of ten electric impulses for each gallon of fuel dispensed.

8. A monitoring system as described comprising a rotary cam formed with a plurality of equally spaced cam lobes about its periphery, said cam being connected to a rotary element of the register mechanism of a fuel dispensing apparatus to be rotated thereby, a switch housing disposed adjacent said cam, there being two fixed contacts and one movable contact within said switch housing, rider means having one element engaging with said cam and having another element extending into said housing for shifting said movable contact alternately into engagement with first one then the other of said fixed contacts, a first line including a primary storage capacitor and running to one of said fixed contacts and to a common ground, a second line connected to the other of said fixed contacts and having a spur leading to said movable contact, a secondary capacitor spliced in said spur, a remote electromagnetically operated counter, a switch controlled power line to said counter and relay means for closing said switch, said relay being in said first line leading to said fixed grounded contact, whereby upon said movable contact being alternately cammed into contact with the grounded one of said fixed contacts, said relay is energized.

9. A monitoring system for an automotive fuel dispensing apparatus comprising a sealed casing having flat side walls, a shaft journalled in said walls adjacent the periphery thereof, a 10-lobed rotary cam fixed to a unit rotary shaft of the register mechanism of said apparatus, means restricting rotary movement of said casing, a single pole, double throw switch device fixed in said casing adjacent said cam, said switch device including spaced fixed contacts and a movable contact positioned therebetween, one of said fixed contacts being grounded, means riding on said cam and connected to said movable contact for shifting same alternately into contact with one and then the other of said fixed contacts as said shaft is rotated, a pulse operated monitoring counter positioned at a point remote from said dispensing apparatus convenient to a supervisor, a standard voltage power input circuit at said point including said counter, a relay operated switch in said power circuit, a subsidiary low voltage circuit including one line including in series a primary capacitor and said relay and being connected with said grounded contact, a second line including a secondary capacitor and leading to said movable contact, a spur line leading from said second line to the other of said fixed contacts.

10. A monitoring system for fuel dispensers and the like of the type described comprising in combination a triggering device for releasing electric pulses connected to a rotary element of said dispenser having a predetermined rotary movement for each volumetric unit of fuel dispensed, said device being designed to trigger decimal electrical impulses upon each volumetric unit rotation of said element, a remote decimal type electromagnetically operated counter disposed convenient to a supervisor, the initial drum of said counter being movable a half-step upon each energization and each deenergization thereof, a power line including said counter, and an electromagnetically operated relay switch in said line, and circuitry interconnecting said triggering device and said relay, including a storage capacitor dischargeable through said relay under control of said triggering device for effecting quick, discrete pulses through said relay.

11. The appartaus as defined in claim 10, wherein said circuitry includes a subsidiary low voltage circuit including a first line embracing the relay of said switch of the power line, said line terminating by juncture with one of said fixed contacts, a second line leading to the other of said fixed contacts, a spur line leading from said second line to said movable contact, said storage capacitor bridging said lines in advance of said relay device and said spur line, said spur line including a secondary capacitor to be charged from said storage capacitor by a surge of current from said storage capacitor through said relay device upon said movable contact engaging the first mentioned fixed contact.

(References on following page)

References Cited by the Examiner

UNITED STATES PATENTS

| | | | |
|---|---|---|---|
| 1,466,392 | 9/1923 | Evans | 200—24 |
| 2,019,902 | 11/1935 | Geer et al. | |
| 2,260,039 | 10/1941 | Levoy | 200—19 X |
| 2,272,478 | 2/1942 | Poole | 235—117 X |
| 2,547,967 | 4/1951 | Patteen | 222—35 |
| 2,567,018 | 9/1954 | Grob | 317—151 X |
| 2,690,646 | 10/1954 | Clifford | 200—19 X |
| 2,927,474 | 3/1960 | Peras | 317—151 X |
| 3,027,048 | 3/1962 | Rapisarda | 222—35 |
| 3,038,638 | 6/1962 | Notter | 222—26 |
| 3,100,062 | 8/1963 | Spalding | 222—35 |

RAPHAEL M. LUPO, *Primary Examiner.*